United States Patent
Goli et al.

(10) Patent No.: US 12,554,240 B2
(45) Date of Patent: Feb. 17, 2026

(54) DISTRIBUTED INDUSTRIAL CONTROL INVOLVING WIRELESS HUMAN-MACHINE INTERFACE DEVICES

(71) Applicant: Solar Turbines Incorporated, San Diego, CA (US)

(72) Inventors: Suman Goli, San Diego, CA (US); Davina Joshuia, San Diego, CA (US); Jeyalakshmi Iyemperumal, Keelapavoor (IN)

(73) Assignee: Solar Turbines Incorporated, San Diego, CA (US)

( * ) Notice: Subject to any disclaimer, the term of this patent is extended or adjusted under 35 U.S.C. 154(b) by 475 days.

(21) Appl. No.: 18/106,876

(22) Filed: Feb. 7, 2023

(65) Prior Publication Data

US 2024/0264576 A1 Aug. 8, 2024

(51) Int. Cl.
*G05B 19/05* (2006.01)

(52) U.S. Cl.
CPC ......... *G05B 19/054* (2013.01); *G05B 19/056* (2013.01)

(58) Field of Classification Search
CPC .. G05B 19/054; G05B 19/056; G05B 19/409; G05B 19/0428
See application file for complete search history.

(56) References Cited

U.S. PATENT DOCUMENTS

| | | | |
|---|---|---|---|
| 6,990,432 B1 * | 1/2006 | McCarthy, IV | F02C 9/00 702/182 |
| 10,564,062 B2 | 2/2020 | Karg et al. | |
| 10,920,562 B2 | 2/2021 | Janakiraman et al. | |
| 2006/0031681 A1 | 2/2006 | Smith et al. | |

(Continued)

FOREIGN PATENT DOCUMENTS

| | | |
|---|---|---|
| CN | 107145298 A | 9/2017 |
| CN | 109189012 A | 1/2019 |

(Continued)

OTHER PUBLICATIONS

Anonymous: "3GPP TS 22.866; enhanced Relays for Energy Efficiency and Extensive Coverage; Stage 1 (Release 17)", Sep. 12, 2019 (Sep. 12, 2019), pp. 1-41, XP055748220, 650 Route des Lucioles—Sophia Antipolis Valbonne—France Retrieved from the Internet: URL:https://ftp.3gpp.org//Specs/archive/22_series/22.866/22866-100.zip [retrieved on Nov. 9, 2020] see p. 10, item [PRS.1.6-6].

(Continued)

*Primary Examiner* — Christopher E. Everett

(57) ABSTRACT

Large industrial machines, such as gas turbine engines, typically have a control room or control panel, acting as a single local control point from which the machine is operated. However, this prevents technicians from controlling the machine at locations that are distant from the control point, as may be necessary during servicing or operation. Accordingly, a system is disclosed that enables a wireless human-machine interface to be used to control the machine, in addition to a local human-machine interface. The system may ensure that only a single human-machine interface is able to control the machine at any given time, as well as prevent unauthorized devices from controlling the machine.

20 Claims, 10 Drawing Sheets

(56) References Cited

U.S. PATENT DOCUMENTS

| | | | | |
|---|---|---|---|---|
| 2012/0136507 A1* | 5/2012 | Everett | ............... | E02F 9/262 |
| | | | | 701/2 |
| 2014/0172128 A1* | 6/2014 | Johnson | ............ | G07C 5/008 |
| | | | | 700/83 |
| 2015/0198936 A1* | 7/2015 | McGee | ............ | G05D 1/0061 |
| | | | | 700/40 |
| 2017/0038275 A1* | 2/2017 | Schiff | ................. | G07C 3/00 |
| 2018/0150070 A1 | 5/2018 | Johnson et al. | | |

FOREIGN PATENT DOCUMENTS

| | | |
|---|---|---|
| CN | 110888388 B | 12/2020 |
| EP | 3859462 A1 | 8/2021 |

OTHER PUBLICATIONS

Written Opinion and International Search Report for Int'l. Patent Appln. No.PCT/US2024/013910, mailed May 6, 2024 (14 pgs).

\* cited by examiner

DISTRIBUTED INDUSTRIAL CONTROL INVOLVING WIRELESS HUMAN-MACHINE INTERFACE DEVICES

TECHNICAL FIELD

The embodiments described herein are generally directed to control, and, more particularly, distributed industrial control involving wireless human-machine interface devices.

BACKGROUND

An industrial machine, such as a gas turbine engine, may be operated from a processing system, such as a control console or desktop computer, in a control room or control panel. The processing system executes a control application and provides a local human-machine interface (HMI) via a connected display and input device(s) within the control room or panel.

Typically, at least two people are required to diagnose problems with the machine and/or interact with various components (e.g., valves) of the machine, during maintenance or operation. In particular, a first technician must remain at the local human-machine interface to control the machine, while a second technician must interact with the physical components of the machine at varying distances from the local human-machine interface.

Accordingly, it would be advantageous to provide a wireless human-machine interface that can be operated from within a wireless range of the machine. This would enable a technician to interact with both the human-machine interface and the physical components of the machine at the same time and/or location. As a result, the machine could be serviced or operated by a single technician, if necessary. At the very least, a wireless human-machine interface would provide more flexibility in servicing or operating the machine.

However, in order to implement a wireless human-machine interface, there should be security mechanisms to ensure that only authorized devices act as wireless clients, and safety mechanisms to ensure that only one wireless client has control of the machine at any given time. For example, CN 110888388B discloses a human-machine interface for controlling a machine, but does not provide such mechanisms. The present disclosure is directed toward overcoming these problems and/or additional problems discovered by the inventors.

SUMMARY

In an embodiment, a system comprises: a server system configured to control operation of a machine; a local client device that is communicatively coupled with the server system via a wired connection; and at least one wireless client device that is communicatively coupled with the server system via a wireless connection, wherein each of the local client device and the at least one wireless client device executes a human-machine interface that communicates with the server system, wherein each human-machine interface is configured to switch between a read-only mode, which does not allow control of the machine, and a control mode, which allows control of the machine, and wherein the server system is configured to ensure that, at most, only one human-machine interface is in the control mode at any given time.

In an embodiment, a method comprises using at least one hardware processor of a server system that controls a machine to: maintain a record that indicates which one, if any, of a plurality of human-machine interfaces, communicatively coupled to the server system, is currently in a control mode that allows control of the machine; receive a request for control of the machine from a first one of the plurality of human-machine interfaces that is in a read-only mode that does not allow control of the machine; when the record indicates that none of the plurality of human-machine interfaces are currently in the control mode, cause the first human-machine interface to switch from the read-only mode to the control mode; and when the record indicates that a second one of the plurality of human-machine interfaces is currently in the control mode, send a request to relinquish control of the machine to the second human-machine interface, receive an indication of approval or declination of the request to relinquish control of the machine from the second human-machine interface, and when the indication is approval of the request to relinquish control of the machine, cause the first human-machine interface to switch from the read-only mode to the control mode, after the second human-machine interface is switched from the control mode to the read-only mode.

In an embodiment, a system comprises: a gas turbine engine; a structure housing the gas turbine engine; a server system, installed within the structure and interfaced with the gas turbine engine to control operation of the gas turbine engine; a local client device that is communicatively coupled with the server system via a wired connection; and at least one wireless client device that is communicatively coupled with the server system via a wireless connection, wherein each of the local client device and the at least one wireless client device execute a human-machine interface that communicates with the server system, wherein each human-machine interface is configured to switch between a read-only mode, which enables viewing of one or more parameters of the gas turbine engine but does not allow control of the gas turbine engine, and a control mode, which enables viewing of the one or more parameters of the gas turbine engine and allows control of the gas turbine engine, and wherein the server system is configured to maintain a record that indicates which one, if any, of the human-machine interfaces is currently in the control mode, receive a request for control of the gas turbine engine from a first one of the human-machine interfaces that is in the read-only mode, when the record indicates that none of the human-machine interfaces are currently in the control mode, cause the first human-machine interface to switch from the read-only mode to the control mode, and when the record indicates that a second one of the human-machine interfaces is currently in the control mode, send a request to relinquish control of the gas turbine engine to the second human-machine interface, receive an indication of approval or declination of the request to relinquish control of the gas turbine engine from the second human-machine interface, and when the indication is approval of the request to relinquish control of the gas turbine engine, cause the first human-machine interface to switch from the read-only mode to the control mode, after the second human-machine interface is switched from the control mode to the read-only mode.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
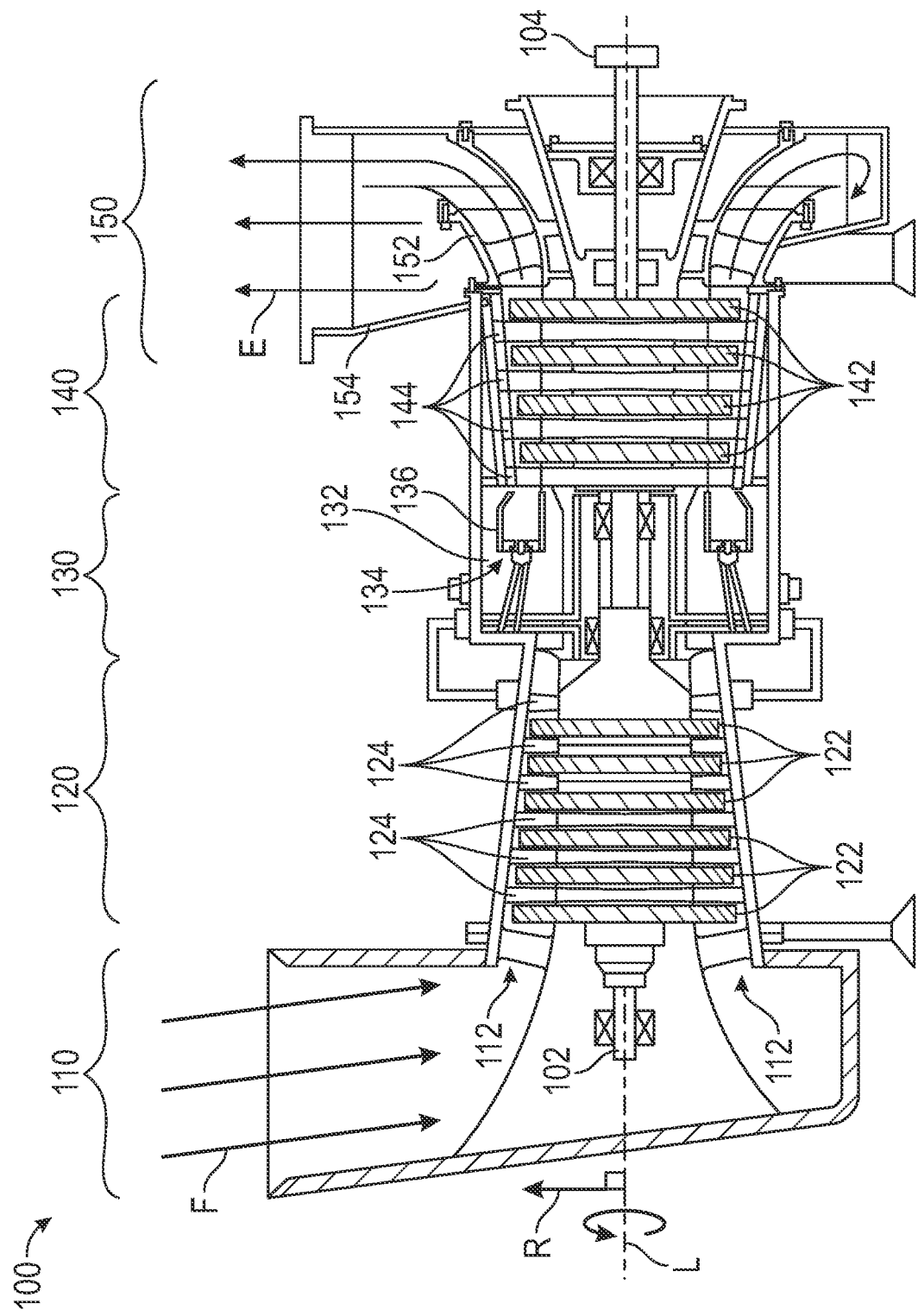
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A radial axis R radiates outward from longitudinal axis L at a substantially orthogonal angle to longitudinal axis L. A number of components of gas turbine engine 100 are concentric with longitudinal axis L and may be annular to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., a primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades extending outward along a radial axis R. The rotor blades in a rotor disk are separated, axially, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
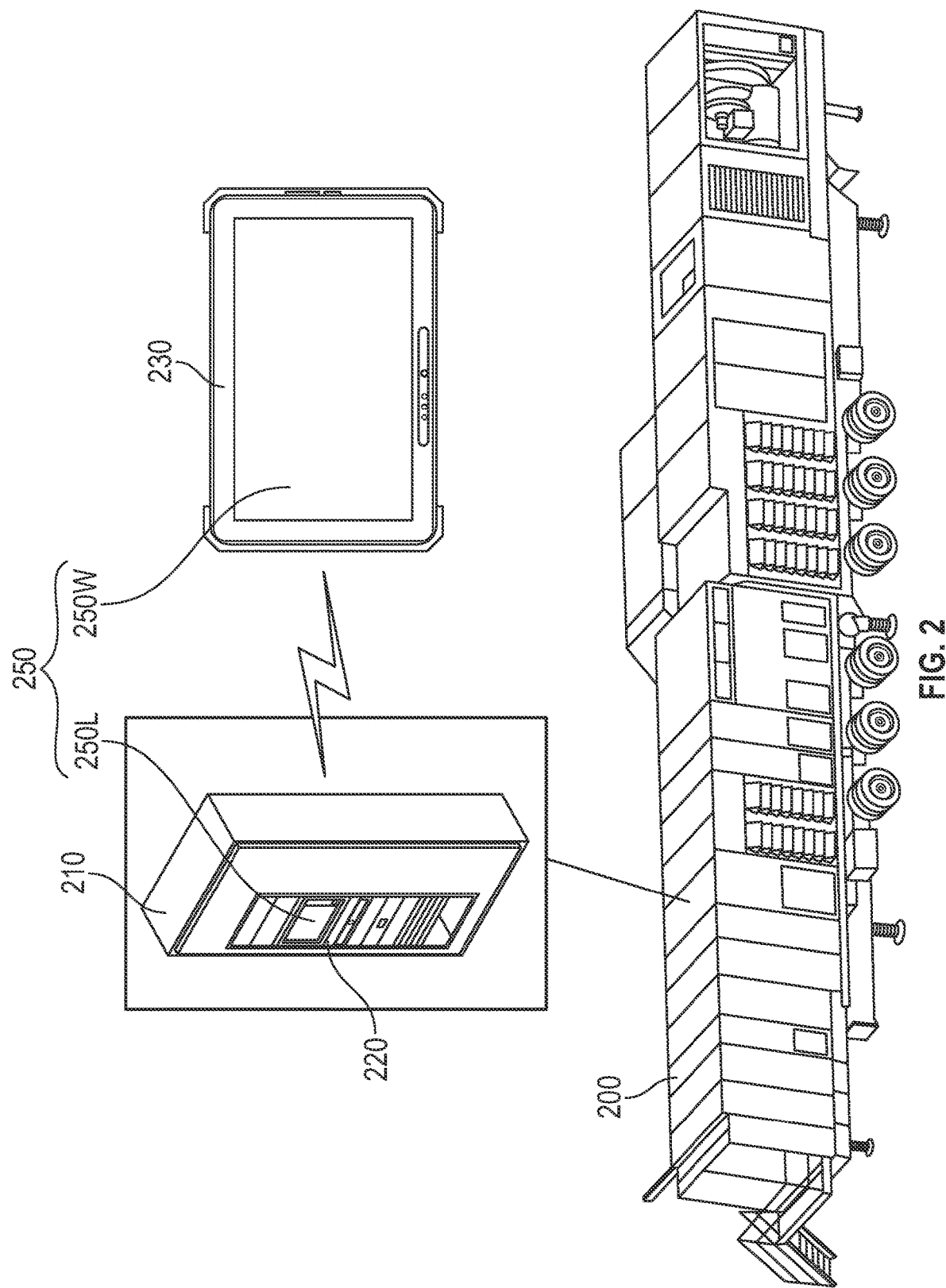
FIG. 2 illustrates an example infrastructure in which a machine may operate, according to an embodiment.

FIG. 2 illustrates an example infrastructure in which a machine may operate, according to an embodiment. In particular, a machine, which may comprise a gas turbine engine 100, may be housed in a structure 200. Structure 200 may be stationary or mobile, and may partially or fully enclose the machine. U.S. patent application Ser. No. 17/508,847, filed on Oct. 22, 2021, which is hereby incorporated herein by reference as if set forth in full, describes one example of a connectable pair of transportation trailers that may be used as a mobile structure 200 for a gas turbine engine 100. However, it should be understood that structure 200 may take any suitable form, such as a trailer, a room, a building, a frame, or the like. In an alternative embodiment, structure 200 may be omitted, such that the machine is not enclosed in any structure.

The infrastructure may comprise a fixed or otherwise stationary server system 210. For example, server system 210 may be installed within a control room, control panel, control cabinet, or the like of structure 200. Server system 210 may host and execute control software that controls the machine. The control software may utilize a wired machine-machine interface to receive measurements or other parameters from one or more physical components of the machine, and/or send control instructions to one or more physical components of the machine (e.g., based on the received parameters). These communications may be performed via physical cabling. In particular, server system 210 may be communicatively coupled to one or more programmable logic controllers (PLCs) that receive the output from various sensors and other components of the machine and/or send control signals to various components of the machine. The programmable logic controller(s) may relay sensor outputs as the parameter(s) to server system 210, and/or derive parameter(s) from the sensor outputs and provide those derived parameter(s) to server system 210. The programmable logic controller(s) may also relay control signals from server system 210, and/or derive control signals from control information sent by server system and provide those derived control signals to one or more components of the machine.

In an embodiment in which the machine is a gas turbine engine 100, examples of parameters that may be received by the control software of server system 210 include, without limitation, real power, apparent power, reactive power, power factor, vibration, oil pressure, compressor discharge pressure (PCD), gas turbine speed (NGP), oil temperature, inlet temperature (T1), outlet temperature (T5), fuel flow, operating mode, generator frequency, generator voltage, generator current, bus frequency, bus voltage, and/or the like. Examples of control instructions that may be sent by the control application include, without limitation, starting up or shutting down the machine, setting or adjusting a setpoint of a component of the machine (e.g., gas turbine speed, pressure, fuel mixture, etc.), setting or changing an operating mode of the machine or a component of the machine (e.g., switching between normal operating mode and low-emissions mode), opening, closing, or otherwise adjusting a valve, opening or closing a switch, activating, deactivating, or otherwise changing a state of a component (e.g., turning a generator heater on or off), and/or the like.

In addition to server system 210, the infrastructure may comprise a local client device 220 and one or more wireless client devices 230. Local client device 220 may be communicatively coupled with server system 210 via a wired connection (e.g., physical cabling), such that local client device 220 does not utilize any wireless communications to communicate with server system 210. Thus, local client device 220 may be inherently more secure than wireless client device(s) 230. In an embodiment, local client device is installed or integrated with server system 210 into a shared control panel, control cabinet, or other housing. For example, local client device 220 may be a desktop computer or workstation, an integrated display console, or the like. It is generally contemplated that, like server system 210, local client device 220 would be fixed to structure 200 (e.g., fixed to a control console) or otherwise difficult to move.

In contrast to local client device 220, each wireless client device 230 may be a mobile device that is easily portable. For example, a wireless client device 230 may be a tablet computer or smartphone with a touch-screen display. Wireless client device 230 may be ruggedized (e.g., with a protective housing) to prevent or minimize damage from being dropped, struck, and/or the like, while being used in the field. In an embodiment, when not in use, wireless client device(s) 230 may be docked at a docking station in the control room or at a control panel or cabinet (e.g., with or near local client device 220) for storage and/or charging.

Each wireless client device 230 utilizes wireless communications to communicate with server system 210. In an embodiment, each wireless client device 230 utilizes a medium-range wireless communication technology, such as Wi-Fi™. The wireless communication technology may be selected to have a range that is sufficient to encompass the entirety of the machine, but not extend beyond a distance within which a technician should remain during control of the machine. For example, the range of the wireless communication technology may be around 50 feet to 200 feet, and preferably around 100 feet, from the machine. However, in alternative embodiments, a short-range wireless communication technology (e.g., Bluetooth™, Zigbee™, etc.) or a long-range wireless communication technology (e.g., third generation (3G), fourth generation (4G), or fifth generation (5G) cellular network technology, etc.) may be used.

In an embodiment, the infrastructure may utilize a local area network (LAN) to connect server system 210 to local client device 220 and one or a plurality of wireless client devices 230. Server system 210 and local client device 220 may be connected to the local area network via physical cabling (e.g., Ethernet cables), whereas each wireless client device 230 may be connected to the local area network via wireless communications (e.g., Wi-Fi™) with a wireless network access point. The local area network may comprise one or a plurality of wireless network access points, which may be positioned to provide coverage to all areas around and/or within the machine from which a technician might reasonably (e.g., safely) control the machine.

The infrastructure further comprises human-machine interfaces 250 that are distributed across local client device 220 and wireless client device(s) 230. In particular, local client device 220 executes a local human-machine interface 250L, and each wireless client device 230 executes a wireless human-machine interface 250W. Thus, the infrastructure comprises a plurality of human-machine interfaces 250. Local human-machine interface 250L and wireless human-machine interface 250W may be substantially identical, at least in terms of functionality, and abstracted from the particular communication technology that is utilized by the underlying client device 220 or 230 to communicate with server system 210. Alternatively, local human-machine interface 250L and wireless human-machine interface 250W may differ in one or more aspects (e.g., color schemes, functionality, etc.).

Each human-machine interface 250 communicates with server system 210. The software implementing each human-machine interface 250 may comprise a client application that provides a graphical user interface comprising one or more screens. Each screen may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like. In an embodiment, the client application may be a web browser. In this case, the web browser may request the screen(s) of the graphical user interface as webpage(s) generated by server system 210, and render those screen(s) on the respective client device 220 or 230. In an alternative embodiment, the client application may itself generate the screen(s) of the graphical user interface. In this case, server system 210 may implement a web service that receives requests from the respective client device 220 or 230 and provides responses in an appropriate format, such as extensible Markup Language (XML), JavaScript Object Notation (JSON), or the like. The client application may receive the responses from server system 210 and generate and render the graphical user interface based on the responses from server system 210.

Figure 3:
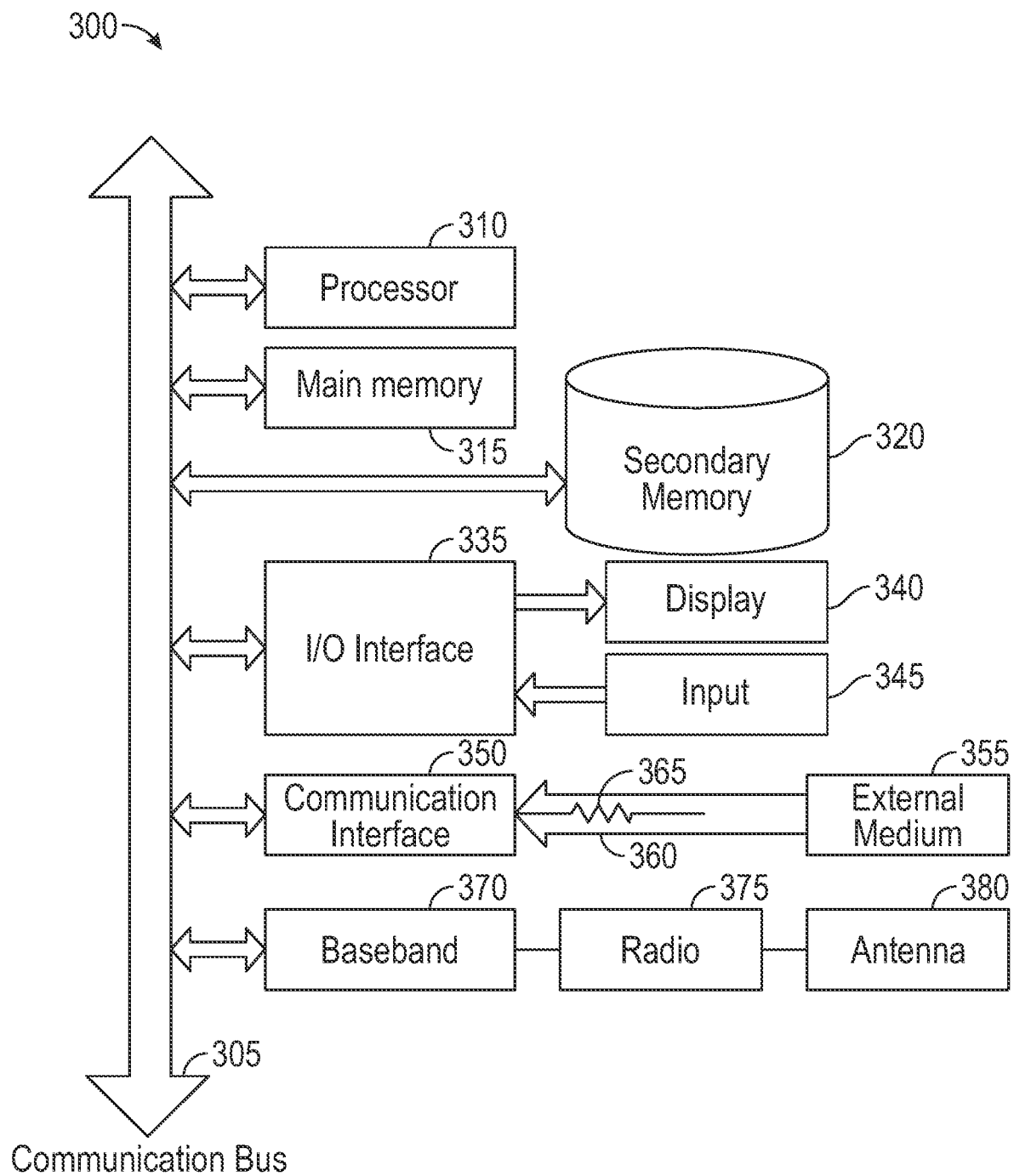
FIG. 3 illustrates an example processing system, by which one or more of the processes described herein, may be executed, according to an embodiment.

FIG. 3 illustrates an example processing system 300, by which one or more of the processes, described herein, may be executed, according to an embodiment. For example, system 300 may be used as or in conjunction with one or more of the processes, methods, or functions described herein (e.g., to store and/or execute the control software, human-machine interfaces 250, and/or other software described herein), and may represent components of server system 210, local client device 220, wireless client device 230, and/or any other processing devices described herein. System 300 can be any processor-enabled device that is capable of wired or wireless data communication. Other processing systems and/or architectures may also be used, as will be clear to those skilled in the art.

System 300 preferably includes one or more processors 310. Processor(s) 310 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with processor 310. Examples of processors which may be used with system 300 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 310 is preferably connected to a communication bus 305. Communication bus 305 may include a data channel for facilitating information transfer between storage and other peripheral components of system 300. Furthermore, communication bus 305 may provide a set of signals used for communication with processor 310, including a data bus, address bus, and/or control bus (not shown). Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 300 preferably includes a main memory 315 and may also include a secondary memory 320. Main memory 315 provides storage of instructions and data for programs executing on processor 310, such as any of the software discussed herein. It should be understood that programs stored in the memory and executed by processor 310 may be written and/or compiled according to any suitable language, including without limitation C/C++, Java, JavaScript, Perl, Python, Visual Basic, .NET, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 320 is a non-transitory computer-readable medium having computer-executable code (e.g., any of the software disclosed herein) and/or other data stored thereon. The computer software or data stored on secondary memory 320 is read into main memory 315 for execution by processor 310. Secondary memory 320 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

System 300 may comprise an input/output (I/O) interface 335. I/O interface 335 provides an interface between one or more components of system 300 and one or more input and/or output devices. Examples of input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device, in a display console, etc.), by which inputs (e.g., virtual buttons, virtual keyboard, etc.) can be both viewed (e.g., along with data) and operated. For example, local client device 220 may comprise a console with a touch panel display, and wireless client device 230 may comprise a tablet computer, smartphone, or other mobile device with a touch panel display. It is generally contemplated that I/O interface 335 of local client device 220 and each wireless client device 230 will interface with at least a display 340 and an input 345, whether as separate devices or integrated into a touch panel display.

System 300 may include a communication interface 350. Communication interface 350 allows software and data to be transferred between system 300 and external devices (e.g. printers), networks, or other information sources. For example, data may be transferred to system 300 from a network server (e.g., server system 210) via communication interface 350. Examples of communication interface 350 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 300 with a network (e.g., local area network) or another computing device. Communication interface 350 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/ Internet protocol (TCP/IP), serial line Internet protocol/point to point protocol (SLIP/PPP), and so on, but may also implement customized or non-standard interface protocols as well.

Software and data transferred via communication interface 350 are generally in the form of electrical communication signals 365 from or to an external medium 355. These signals 365 may be provided to communication interface 350 via a communication channel 360 between communication interface 350 and external medium 355. In an embodiment, communication channel 360 may be a wired network (e.g., in the case of local client device 220) or wireless network (e.g., in the case of wireless client device 230), or any variety of other communication links. Communication channel 360 carries signals 365 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., the disclosed software) is stored in main memory 315 and/or secondary memory 320. Computer-executable code can also be received via communication interface 350 and stored in main memory 315 and/or secondary memory 320. The computer-executable code, when executed, enables system 300 to perform the various functions of the disclosed embodiments as described elsewhere herein.

System 300 may also include wireless communication components that facilitate wireless communication over a voice network and/or a data network (e.g., in the case of wireless client device 230). The wireless communication components may comprise an antenna system 380, a radio system 375, and a baseband system 370. In system 300, radio frequency (RF) signals are transmitted and received over the air by antenna system 380 under the management of radio system 375.

In an embodiment, antenna system 380 may comprise one or more antennae and one or more multiplexors (not shown) that perform a switching function to provide antenna system 380 with transmit and receive signal paths. In the receive path, received RF signals can be coupled from a multiplexor to a low noise amplifier (not shown) that amplifies the received RF signal and sends the amplified signal to radio system 375.

In an alternative embodiment, radio system 375 may comprise one or more radios that are configured to communicate over various frequencies. In an embodiment, radio system 375 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 375 to baseband system 370.

Baseband system 370 is also communicatively coupled with processor(s) 310. Processor(s) 310 may have access to data storage areas 315 and 320. Processor(s) 310 are preferably configured to execute computer-executable code (i.e., the disclosed software) that can be stored in main memory 315 or secondary memory 320. Computer-executable code can also be received from baseband processor 370 and stored in main memory 315 or in secondary memory 320, or executed upon receipt. Such computer-executable code, when executed, can enable system 300 to perform the various functions of the disclosed embodiments.

In this description, the term "computer-readable medium" is used to refer to any non-transitory computer-readable storage media used to provide computer-executable code and/or other data to or within system 300. Examples of such media include main memory 315, secondary memory 320, external medium 355, and any peripheral device communicatively coupled with communication interface 350 or baseband 370 (including a network information server or other network device).

Exemplary processes will now be described. These exemplary processes may be implemented as software, stored on a non-transitory computer-readable medium (e.g., main memory 315, secondary memory 320, external medium 355, etc.), that is executed by one or more processors 310 in a processing system 300 within the described infrastructure. The described processes may be implemented as instructions represented in source code, object code, and/or machine code. These instructions may be executed directly by hardware processor(s) 310, or alternatively, may be executed by a virtual machine operating between the object code and hardware processor(s) 310. It should be understood that any of the disclosed software may be implemented as standalone software or may be integrated into a larger software application with additional functionality.

In an alternative embodiment, the described processes may be implemented as a hardware component (e.g., specific-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 4:
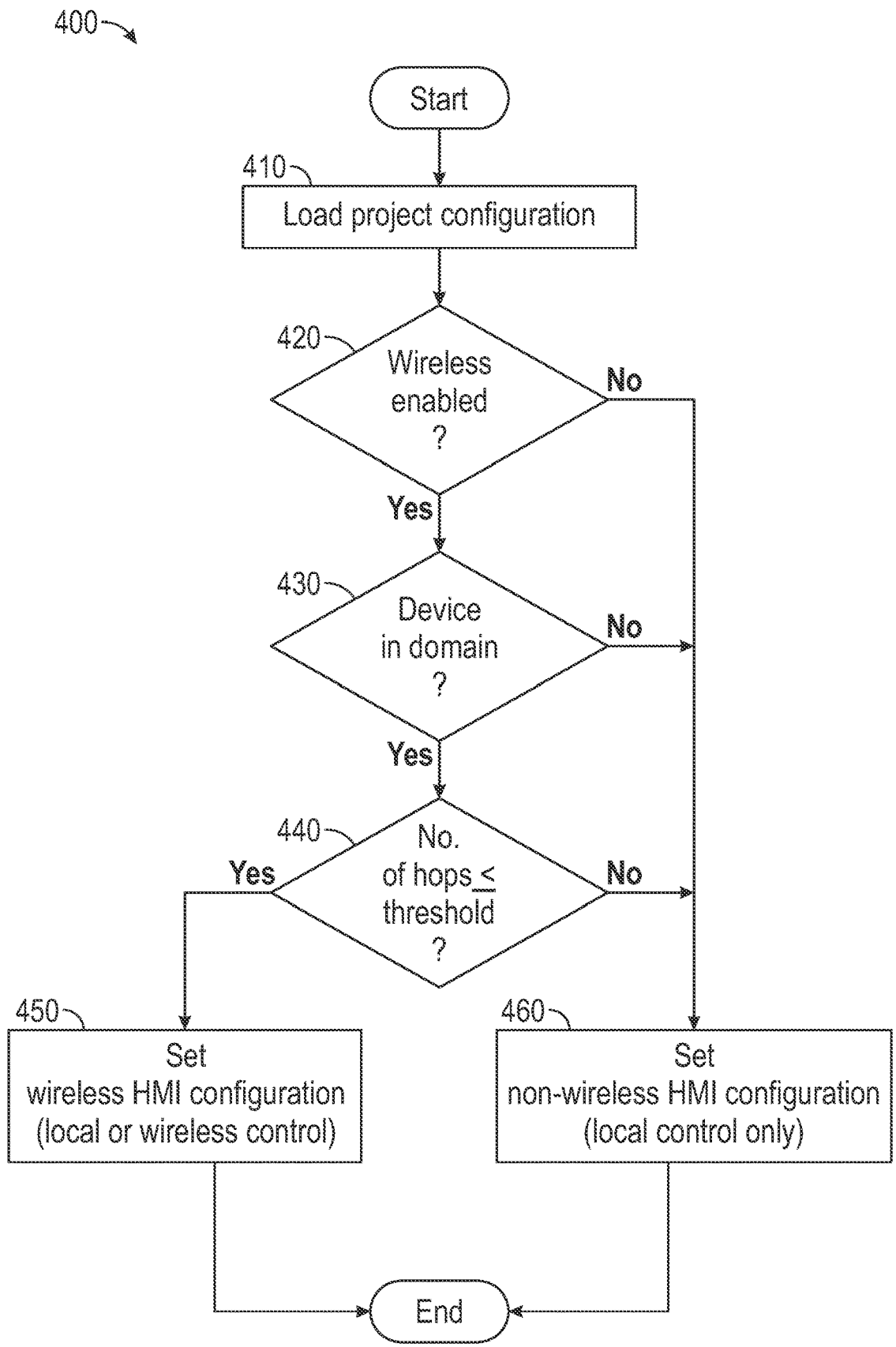
FIG. 4 illustrates an example process for configuring a server system, according to an embodiment.

FIG. 4 illustrates an example process 400 for configuring server system 210, according to an embodiment. In particular, process 400 may determine whether or not control of the machine is offered in a wireless or non-wireless HMI configuration. It is generally contemplated that process 400 will be implemented in software that is executed by one or more processor(s) 310 of server system 210. However, in an alternative embodiment, process 400 could be executed by another processing system or distributed across a plurality of processing systems.

Initially, in subprocess 410 the project configuration for the machine is loaded. The project configuration may comprise one or a plurality of settings of the overall human-machine interface. These settings may define the users with permissions to access human-machine interfaces 250 and/or control the machine, the parameters accessible through human-machine interfaces 250, the controls available through human-machine interfaces 250, the layout of human-machine interfaces 250, whether or not wireless control is enabled for the machine, the security domain for human-machine interfaces 250, and/or the like.

The project configuration may be loaded from a database stored in a non-transitory computer-readable medium of server system 210 (e.g., secondary memory 320, external medium 355, etc.). However, in an embodiment, at least a subset of the settings are loaded or otherwise derived from one or more programmable logic controllers installed in the machine. For example, a setting of whether or not wireless control is enabled for the machine may be loaded from a programmable logic controller installed in the machine. Setting(s) that are loaded from the programmable logic controller(s) of the machine are less susceptible to hacking or other malicious activity, since a malicious actor would need to have physical access to the machine to change the setting. Accordingly, at least a subset of the security-related setting(s) may be stored in the programmable logic controller(s) of the machine, and loaded by server system 210 into the project configuration via the machine-machine interface between server system 210 and the programmable logic controller(s) of the machine.

In subprocess 420, it is determined whether or not wireless control is enabled for the machine. The enablement of wireless control could be a setting, in the project configuration of the human-machine interface, that is retrieved from a database in a non-transitory computer-readable medium of server system 210. However, as discussed above, in a preferred embodiment, the enablement of wireless control is a setting, in the project configuration of the human-machine interface, that is loaded from programmable logic controller(s) installed in the machine, to provide additional security. In either case, when the setting indicates that wireless control is enabled for the machine (i.e., "Yes" in subprocess 420), process 400 proceeds to subprocess 430. Otherwise, when the project configuration indicates that wireless control is not enabled for the machine (i.e., "No" in subprocess 420), process 400 proceeds to subprocess 460.

In subprocess 430, it is determined whether or not there are any wireless client devices 230 within the security domain of the project configuration. In an embodiment, the security domain comprises a set (e.g., range, list, etc.) of Internet Protocol (IP) addresses, a set (e.g., range, list, etc.) of Media Access Control (MAC) addresses, and/or the like. Subprocess 430 may determine whether or not there are any wireless client devices 230 connected to server system 210 (e.g., via the local area network) with an IP address and/or MAC address within the security domain. In particular, a wireless client device 230 may be determined to be within the security domain when the IP address of the wireless client device 230 is within the set of IP addresses and/or the MAC address of the wireless client device 230 is within the set of MAC addresses. It should be understood that, when IP addresses are used to determine whether or not a wireless client device 230 is within the security domain, wireless client devices 230 may utilize static IP addresses. When at least one wireless client device 230 within the security domain is connected to server system 210 (i.e., "Yes" in subprocess 430), process 400 proceeds to subprocess 440.

Otherwise, when no wireless client device 230 is within the security domain (i.e., "No" in subprocess 430), process 400 proceeds to subprocess 460.

In subprocess 440, it is determined whether or not the number of hops, between the wireless client device(s) 230 within the security domain and server system 210, is less than or equal to a threshold number of hops. It should be understood that a "hop" in this context refers to an intermediary device between the wireless client device 230 and server system 210. An intermediary device may be an access point, network router, range extender, or the like. Generally, the threshold number of hops should be small, such as zero, one, or two. A larger number of hops may be indicative of an intrusion into the network. When the number of hops between at least one wireless client device 230 and server system 210 is less than or equal to the threshold number of hops (i.e., "Yes" in subprocess 440), process 400 proceeds to subprocess 450. Otherwise, when the number of hops between all wireless client device(s) 230 and server system 210 is greater than the threshold number of hops (i.e., "No" in subprocess 440), process 400 proceeds to subprocess 460.

It should be understood that, collectively, subprocess 430 and 440 determine whether or not there are any authorized wireless client devices 230 communicatively coupled to server system 210. A wireless client device 230 may be determined to be authorized when the wireless client device 230 is both within the security domain (i.e., "Yes" in subprocess 430) and communicatively coupled to server system 210 by less than or equal to the threshold number of hops (i.e., "Yes" in subprocess 440). However, in an alternative embodiment, fewer, additional, or different criteria may be utilized to determine whether or not a wireless client device 230 is authorized to interface with the machine through server system 210. In any case, when there is at least one authorized wireless client device 230 communicatively coupled to server system 210, process 400 may proceed to subprocess 450, whereas, when there are no authorized wireless client devices 230 communicatively coupled to server system 210, process 400 may proceed to subprocess 460.

In subprocess 450, the overall human-machine interface is configured into a wireless HMI configuration. In the wireless HMI configuration, any authorized wireless client device(s) 230 are allowed to control the machine through wireless human-machine interface 250W. This is in addition to local client device 220 that is allowed to control the machine through local human-machine interface 250L. Thus, in the wireless HMI configuration, the machine may be controlled by either local human-machine interface 250L or wireless human-machine interface 250W. In other words, both local control and wireless control are allowed. As is discussed in greater detail elsewhere herein, in the wireless HMI configuration, control may be limited to one human-machine interface 250 at a time, but may be passed around, over time, between local human-machine interface 250L and the wireless human-machine interface 250W of any authorized wireless client device 230. In other words, server system 230 ensures that, at most, only one human-machine interface 250, whether 250L or 250W, is allowed to control the machine (i.e., be in a control mode) at any given time.

In subprocess 460, human-machine interface 250 is configured into a non-wireless HMI configuration. In the non-wireless HMI configuration, no wireless client devices 230 are allowed to control the machine via wireless human-machine interface 250W. In other words, local control is allowed and wireless control is disallowed. In an embodiment, in the non-wireless HMI configuration, a user may still log in to wireless human-machine interface 250W, to view parameter(s) of the machine in a read-only mode, but is not allowed to control the machine. In an alternative embodiment, in the non-wireless HMI configuration, human-machine interface 250 may consist solely of local human-machine interface 250L on local client device 220, such that not even read-only access is provided to any wireless client device 230.

In an embodiment, each human-machine interface 250 is configured to switch between a read-only mode, which does not allow control of the machine, and a control mode, which allows control of the machine. It should be understood that both the read-only mode and the control mode may enable access to one or more parameters of the machine. For example, each human-machine interface 250 may comprise a graphical user interface. In the control mode, the graphical user interface may visually represent one or more parameters of the machine and include one or more inputs for controlling the machine. In the control mode, human-machine interface 250 may also comprise an input for relinquishing control of the machine. In the read-only mode, the graphical user interface may visually represent the one or more parameters of the machine, but does not include the one or more inputs for controlling the machine. In the read-only mode, human-machine interface 250 may also comprise an input for requesting control of the machine.

Figure 5:
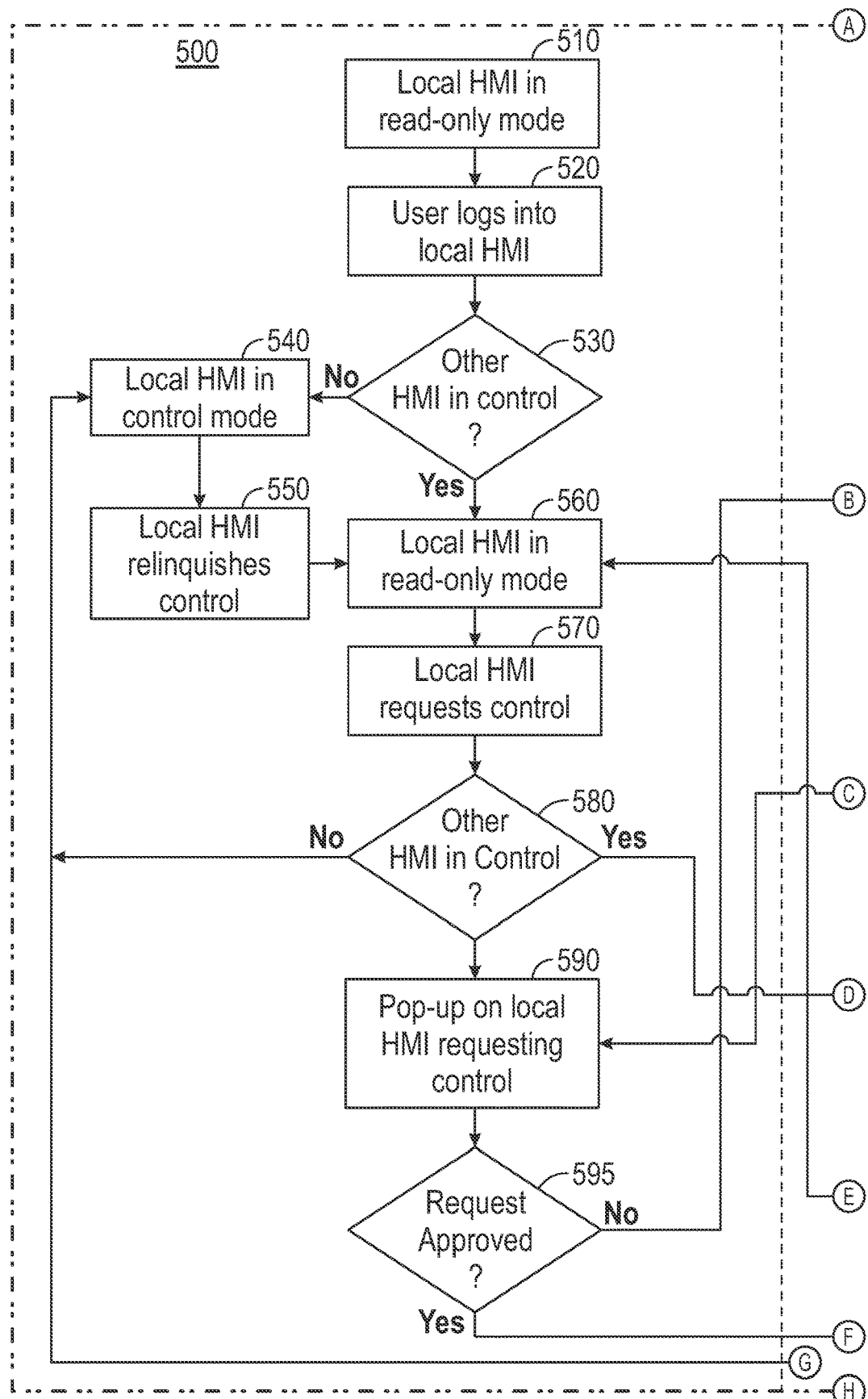
FIGS. 5 and 6 illustrate example processes for resolving modes in local and wireless human-machine interfaces, according to an embodiment.
Figure 6:
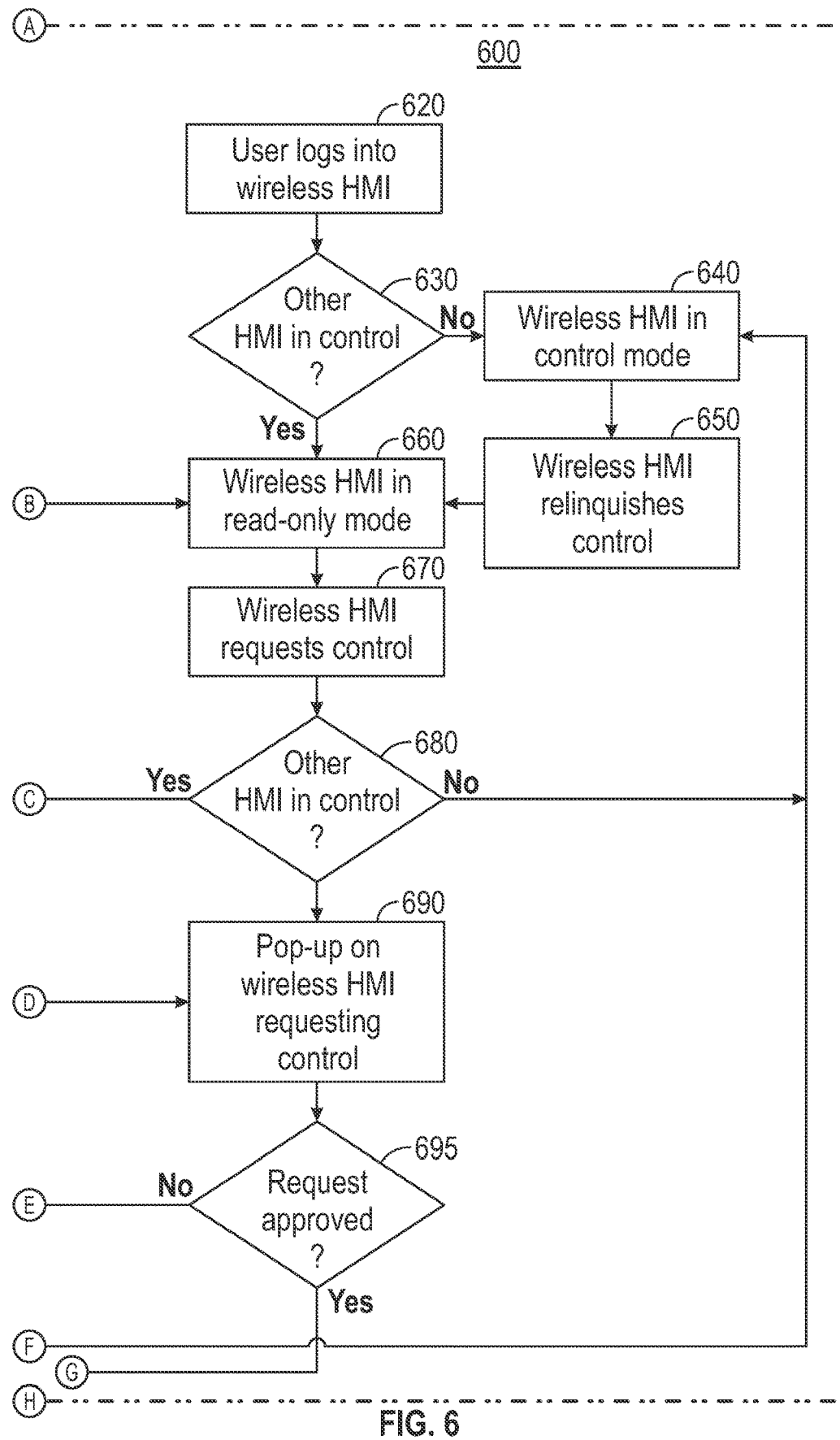

FIGS. 5 and 6 illustrates example processes for resolving modes in local human-machine interface 250L and wireless human-machine interface 250W, according to an embodiment. In particular, local human-machine interface 250L may implement process 500 in FIG. 5 to switch between the read-only mode and the control mode, and wireless human-machine interface 250W may implement process 600 in FIG. 6 to switch between the read-only mode and the control mode. It should be understood that process 500 may be executed by one or more processor(s) 310 of a local client device 220, and that process 600 may be executed by one or more processor(s) 310 of a wireless client device 230.

In the read-only mode, a human-machine interface, whether local human-machine interface 250L or wireless human-machine interface 250W, only displays parameters of the machine and/or other information about the machine, without providing any control of the machine. In contrast, in the control mode, the human-machine interface may display parameters and other information about the machine, and provide one or more inputs for controlling the machine. Thus, the human-machine interface in the read-only mode may comprise no operable inputs (e.g., no inputs or disabled inputs) for controlling the machine, whereas the human-machine interface in the control mode may comprise operable inputs for controlling the machine. The human-machine interface in the read-only mode may also differ from the human-machine interface in the control mode in other manners. For example, the color scheme of the read-only mode may be different than the color scheme of the control mode. In an embodiment, server system 210 ensures that, at most, only a single human-machine interface 250 is in the control mode at any given time, whereas all other human-machine interfaces 250, if any, must be in the read-only mode. This avoids the possibility of the machine receiving conflicting or inconsistent control inputs, as may arise if multiple human-machine interfaces 250 were active in the control mode at the same time. It should be understood that it is possible for no human-machine interface 250 to possess control of the machine (i.e., no human-machine interface 250 is in the control mode).

The only significant difference between processes 500 and 600 may be that local human-machine interface 250L is always active, even when a user is not logged into local human-machine interface 250L. In particular, local human-machine interface 250L may initialize into the read-only mode in subprocess 510, even before a user logs into local human-machine interface 250L. In addition, when a user logs out of local human-machine interface 250L, local human-machine interface 250L may remain active, but only in the read-only mode. This is appropriate, since local client device 220 is fixed to structure 200, such that a malicious actor would need to gain access to structure 200 in order to have access to local human-machine interface 250L. In contrast, a wireless human-machine interface 250W is not active until a user logs in to the wireless human-machine interface 250W, and becomes inactive after a user logs out of wireless human-machine interface 250W.

In subprocess 520, a user logs in to local human-machine interface 250L. For example, the user may interact with local client device 220 in the control room, control panel, control cabinet, or the like of structure 200 enclosing the machine. Logging in may comprise the user interacting with a log-in screen of local human-machine interface 250L to authenticate with local human-machine interface 250L using valid credentials, such as a username and password, digital certificate, biometric information, and/or the like.

In subprocess 530, local human-machine interface 250L determines whether or not another human-machine interface 250 is in the control mode. For example, local human-machine interface 250L may request control from server system 210. Server system 210 may maintain a record that indicates which one, if any, of a plurality of human-machine interfaces 250, communicatively coupled to server system 210, is currently in the control mode. Thus, when server system 210 receives the request for control of the machine from local human-machine interface 250L, server system 210 may check the record, and approve the request if no other human-machine interface 250 is in the control mode or deny the request if another human-machine interface 250 is in the control mode. When no other human-machine interface 250 is in the control mode (i.e., "No" in subprocess 530), local human-machine interface 250L switches to the control mode and proceeds to subprocess 540. In other words, server system 210 may cause local human-machine interface 250L to switch from the read-only mode to the control mode by approving the request for control of the machine received from local human-machine interface 250L. Otherwise, when another human-machine interface is in the control mode (i.e., "Yes" in subprocess 530), local human-machine interface 250L remains in the read-only mode and proceeds to subprocess 560. In other words, server system 210 may cause local human-machine interface 250L to remain in the read-only mode by denying or ignoring the request for control of the machine received from local human-machine interface 250L.

In subprocess 540, local human-machine interface 250L operates in the control mode. In the event that local human-machine interface 250L has just switched from the read-only mode to the control mode, local human-machine interface 250L may be updated to provide inputs for controlling the machine. In other words, inputs for controlling the machine may appear or become enabled in the graphical user interface of local human-machine interface 250L. Thus, the logged-in user may perform control operations on the machine via local human-machine interface 250L executing on local client device 220.

In subprocess 550, local human-machine interface 250L may relinquish control of the machine. For example, local human-machine interface 250L, in the control mode, may comprise an input for relinquishing control of the machine. In response to operation of this input by the logged-in user, local human-machine interface 250L may switch from the control mode to the read-only mode and proceed to subprocess 560. Additionally or alternatively, each local human-machine interface 250L may implement an inactivity timer that counts down for as long as a continuous period of inactivity (i.e., in which no user interaction with local human-machine interface 250L occurs) increases in duration, and may automatically relinquish control of the machine in response to expiration of the inactivity timer. In either case, the relinquishment of control may be communicated by local human-machine interface 250L to server system 210, which may update its record to reflect that no human-machine interface 250 is currently in the control mode.

In subprocess 560, local human-machine interface 250L operates in the read-only mode. In the event that local human-machine interface 250L has just switched from the control mode to the read-only mode, local human-machine interface 250L may be updated to remove or disable any inputs for controlling the machine. Thus, the logged-in user may review parameter(s) and/or other information about the machine via local human-machine interface 250L, but cannot perform control operations on the machine via local human-machine interface 250L.

In subprocess 570, local human-machine interface 250L may request control of the machine. For example, local human-machine interface 250L, in the read-only mode, may comprise an input for requesting control of the machine. In response to operation of this input by the logged-in user, local human-machine interface 250L may send a request for control of the machine to server system 210.

In response to receiving the request for control of the machine from local human-machine interface 250L, server system 210 may determine whether or not another one of human-machine interfaces 250 is currently in the control mode. In particular, server system 210 may check its record to identify which, if any, other human-machine interface 250 is currently in the control mode. When none of human-machine interfaces 250 are currently in the control mode (i.e., "No" in subprocess 580), server system 210 may cause local human-machine interface 250L to switch from the read-only mode to the control mode and proceed to subprocess 540. In particular, server system 210 may approve the request for control of the machine received from local human-machine interface 250L. Otherwise, when another human-machine interface 250 is currently in the control mode (i.e., "Yes" in subprocess 580), control may be requested from the other human-machine interface in subprocess 690 of process 600. In particular, server system 210 may send a request to relinquish control of the machine to the human-machine interface 250 that is currently in the control mode.

In subprocess 690 of process 600, control may be requested through the wireless human-machine interface 250W that is currently in the control mode. For example, in the control mode, wireless human-machine interface 250W, in response to receiving the request to relinquish control of the machine, may prompt the user of wireless human-machine interface 250W to approve or decline the request to relinquish control of the machine. To prompt the user, wireless human-machine interface 250W may generate a dialog box, overlaid on a screen of the wireless human-machine interface 250W in the control mode. The dialog box may pop up in or near the center of the screen to obtain the user's immediate attention. The dialog box may comprise one or more inputs for either approving or declining the request to relinquish control of the machine. For example, the dialog box may comprise a first input for approving the request to relinquish control of the machine and a second input for declining the request to relinquish control of the machine. The user of the wireless human-machine interface 250W may select the first input to approve the request and transfer control of the machine to local human-machine interface 250L or select the second input to decline the request and maintain control of the machine.

In subprocess 695, the wireless human-machine interface 250W that is currently in the control mode determines whether the request to relinquish control of the machine has been approved or declined in subprocess 690. In other words, wireless human-machine interface 250W receives an approval or declination of the request to relinquish control of the machine (e.g., via the dialog box). Wireless human-machine interface 250W may indicate the approval or declination of the request to relinquish control of the machine to server system 210. When the indication is approval of the request to relinquish control of the machine, wireless human-machine interface 250W may also switch from the control mode to the read-only mode.

When the indication is approval of the request to relinquish control of the machine (i.e., "Yes" in subprocess 695), server system 210 may cause local human-machine interface 250L to switch from the read-only mode to the control mode (e.g., in subprocess 540), after wireless human-machine interface 250W switches from the control mode to the read-only mode. In particular, server system 210 may approve the request for control of the machine received from local human-machine interface 250L after receiving an indication that wireless human-machine interface 250W has switched to the read-only mode. Otherwise, when the indication is declination of the request to relinquish control of the machine (i.e., "No" in subprocess 695), wireless human-machine interface 250W remains in the control mode in subprocess 640, and local human-machine interface 250L remains in the read-only mode in subprocess 560.

Focusing now on process 600, in subprocess 620, a user logs in to a wireless human-machine interface 250W. For example, the user may interact with wireless client device 230 at any location within wireless range of the local area network provided by the infrastructure for the machine. Logging in may comprise the user interacting with a log-in screen of wireless human-machine interface 250W to authenticate with wireless human-machine interface 250W using valid credentials, such as a username and password, digital certificate, biometric information, and/or the like.

In subprocess 630, wireless human-machine interface 250W determines whether or not another human-machine interface 250 is in the control mode. For example, wireless human-machine interface 250W may request control from server system 210. Server system 210 may maintain a record that indicates which one, if any, of a plurality of human-machine interfaces 250, communicatively coupled to server system 210, is currently in the control mode. Thus, when server system 210 receives the request for control of the machine from wireless human-machine interface 250W, server system 210 may check the record, and approve the request if no other human-machine interface 250 is in the control mode or deny the request if another human-machine interface 250 is in the control mode. When no other human-machine interface 250 is in the control mode (i.e., "No" in subprocess 630), wireless human-machine interface 250W switches to the control mode and proceeds to subprocess 640. In other words, server system 210 may cause wireless human-machine interface 250W to switch from the read-only mode to the control mode by approving the request for control of the machine received from wireless human-machine interface 250W. Otherwise, when another human-machine interface is in the control mode (i.e., "Yes" in subprocess 630), wireless human-machine interface 250W remains in the read-only mode and proceeds to subprocess 660. In other words, server system 210 may cause wireless human-machine interface 250W to remain in the read-only mode by denying or ignoring the request for control of the machine received from wireless human-machine interface 250W.

In subprocess 640, wireless human-machine interface 250W operates in the control mode. In the event that wireless human-machine interface 250W has just switched from the read-only mode to the control mode, wireless human-machine interface 250W may be updated to provide inputs for controlling the machine. In other words, inputs for controlling the machine may appear or become enabled in the graphical user interface of wireless human-machine interface 250W. Thus, the logged-in user may perform control operations on the machine via wireless human-machine interface 250W executing on wireless client device 230.

In subprocess 650, wireless human-machine interface 250W may relinquish control of the machine. For example, wireless human-machine interface 250W, in the control mode, may comprise an input for relinquishing control of the machine. In response to operation of this input by the logged-in user, wireless human-machine interface 250W may switch from the control mode to the read-only mode and proceed to subprocess 660. Additionally or alternatively, each wireless human-machine interface 250W may implement an inactivity timer that counts down for as long as a continuous period of inactivity (i.e., in which no user interaction with wireless human-machine interface 250W occurs) increases in duration, and may automatically relinquish control of the machine in response to expiration of the inactivity timer. In either case, the relinquishment of control may be communicated by wireless human-machine interface 250W to server system 210, which may update its record to reflect that no human-machine interface 250 is currently in the control mode.

In subprocess 660, wireless human-machine interface 250W operates in the read-only mode. In the event that wireless human-machine interface 250W has just switched from the control mode to the read-only mode, wireless human-machine interface 250W may be updated to remove or disable any inputs for controlling the machine. Thus, the logged-in user may review parameter(s) and/or other information about the machine via wireless human-machine interface 250W, but cannot perform control operations on the machine via wireless human-machine interface 250W.

In subprocess 670, wireless human-machine interface 250W may request control of the machine. For example, wireless human-machine interface 250W, in the read-only mode, may comprise an input for requesting control of the machine. In response to operation of this input by the logged-in user, wireless human-machine interface 250W may send a request for control of the machine to server system 210.

In response to receiving the request for control of the machine from wireless human-machine interface 250W, server system 210 may determine whether or not another one of human-machine interfaces 250 is currently in the control mode. In particular, server system 210 may check its record to identify which, if any, other human-machine interface 250 is currently in the control mode. When none of human-machine interfaces 250 are currently in the control mode (i.e., "No" in subprocess 680), server system 210 may cause wireless human-machine interface 250W to switch from the read-only mode to the control mode and proceed to subprocess 640. In particular, server system 210 may approve the request for control of the machine received from wireless human-machine interface 250W. Otherwise, when another human-machine interface 250 is currently in the control mode (i.e., "Yes" in subprocess 680), control may be requested from the other human-machine interface in subprocess 590 of process 500. In particular, server system 210 may send a request to relinquish control of the machine to the human-machine interface 250 that is currently in the control mode.

In subprocess 590 of process 500, control may be requested through local human-machine interface 250L, which is currently in the control mode. For example, in the control mode, local human-machine interface 250L, in response to receiving the request to relinquish control of the machine, may prompt the user of local human-machine interface 250L to approve or decline the request to relinquish control of the machine. To prompt the user, local human-machine interface 250L may generate a dialog box, overlaid on a screen of local human-machine interface 250L in the control mode. The dialog box may pop up in or near the center of the screen to obtain the user's immediate attention. The dialog box may comprise one or more inputs for either approving or declining the request to relinquish control of the machine. For example, the dialog box may comprise a first input for approving the request to relinquish control of the machine and a second input for declining the request to relinquish control of the machine. The user of local human-machine interface 250L may select the first input to approve the request and transfer control of the machine to wireless human-machine interface 250W or select the second input to decline the request and maintain control of the machine.

In subprocess 595, local human-machine interface 250L, which is currently in the control mode, determines whether the request to relinquish control of the machine has been approved or declined in subprocess 590. In other words, local human-machine interface 250L receives an approval or declination of the request to relinquish control of the machine (e.g., via the dialog box). Local human-machine interface 250L may indicate the approval or declination of the request to relinquish control of the machine to server system 210. When the indication is approval of the request to relinquish control of the machine, local human-machine interface 250L may also switch from the control mode to the read-only mode.

When the indication is approval of the request to relinquish control of the machine (i.e., "Yes" in subprocess 595), server system 210 may cause wireless human-machine interface 250W to switch from the read-only mode to the control mode, after local human-machine interface 250L switches from the control mode to the read-only mode. In particular, server system 210 may approve the request for control of the machine received from wireless human-machine interface 250W after receiving an indication that local human-machine interface 250L has switched to the read-only mode. Otherwise, when the indication is declination of the request to relinquish control of the machine (i.e., "No" in subprocess 595), local human-machine interface 250L remains in the control mode in subprocess 540, and wireless human-machine interface 250W remains in the read-only mode in subprocess 660.

In an embodiment with a plurality of wireless human-machine interfaces 250W, process 600 may be implemented by each wireless human-machine interface 250W. In other words, each wireless human-machine interface 250W may be identical. In addition, while process 600 is illustrated as interacting with process 500, it should be understood that process 600, implemented by one wireless human-machine interface 250W, may identically or similarly interact with another process 600, implemented by another wireless human-machine interface 250W.

Processes 500 and 600 assume that the logged-in user has permission to control the machine. In an embodiment, users without permission to control the machine may still log in to a human-machine interface 250. However, when a user without permission to control the machine is logged in, the human-machine interface 250 cannot operate in the control mode. In this case, the human-machine interface 250 may only operate in the read-only mode for the logged-in user.

In an embodiment, each human-machine interface 250, in at least the control mode (e.g., in just the control mode or in both the read-only and the control mode), is configured to periodically send a heartbeat communication to server system 210. The heartbeat communication may comprise a simple packet or other signal that is sent to server system 210 at a regular time interval. Server system 210 may be configured to detect a failure in the heartbeat communications from each human-machine interface 250, for example, when no heartbeat communication has been received within a period of time greater than the regular time interval. When a failure is detected in the heartbeat communications from a human-machine interface 250 that is currently in the control mode, server system 210 may force that human-machine interface 250 to relinquish control of the machine. For instance, server system 210 may update its record to reflect that no human-machine interface 250 is in the control mode. Thus, if that human-machine interface 250 subsequently attempts to control the machine, server system 210 will prohibit it. In addition, server system 210 will allow another human-machine interface 250 to take control of the machine.

This heartbeat timeout may be implemented in addition to the inactivity timer, described elsewhere herein, at each human-machine interface 250. Thus, when a period of inactivity, at a human-machine interface 250 in the control mode, exceeds the duration of an inactivity timer, that human-machine interface 250 may automatically relinquish control by sending a message to server system 210. In addition, when server system 210 detects a failure in the heartbeat communications from a human-machine interface 250 that is currently in the control mode, server system 210 may automatically force that human-machine interface 250 to relinquish control by updating its record. Thus, there are at least two mechanisms to prevent an inactive or failed human-machine interface 250 from retaining control of the machine.

Figure 7:
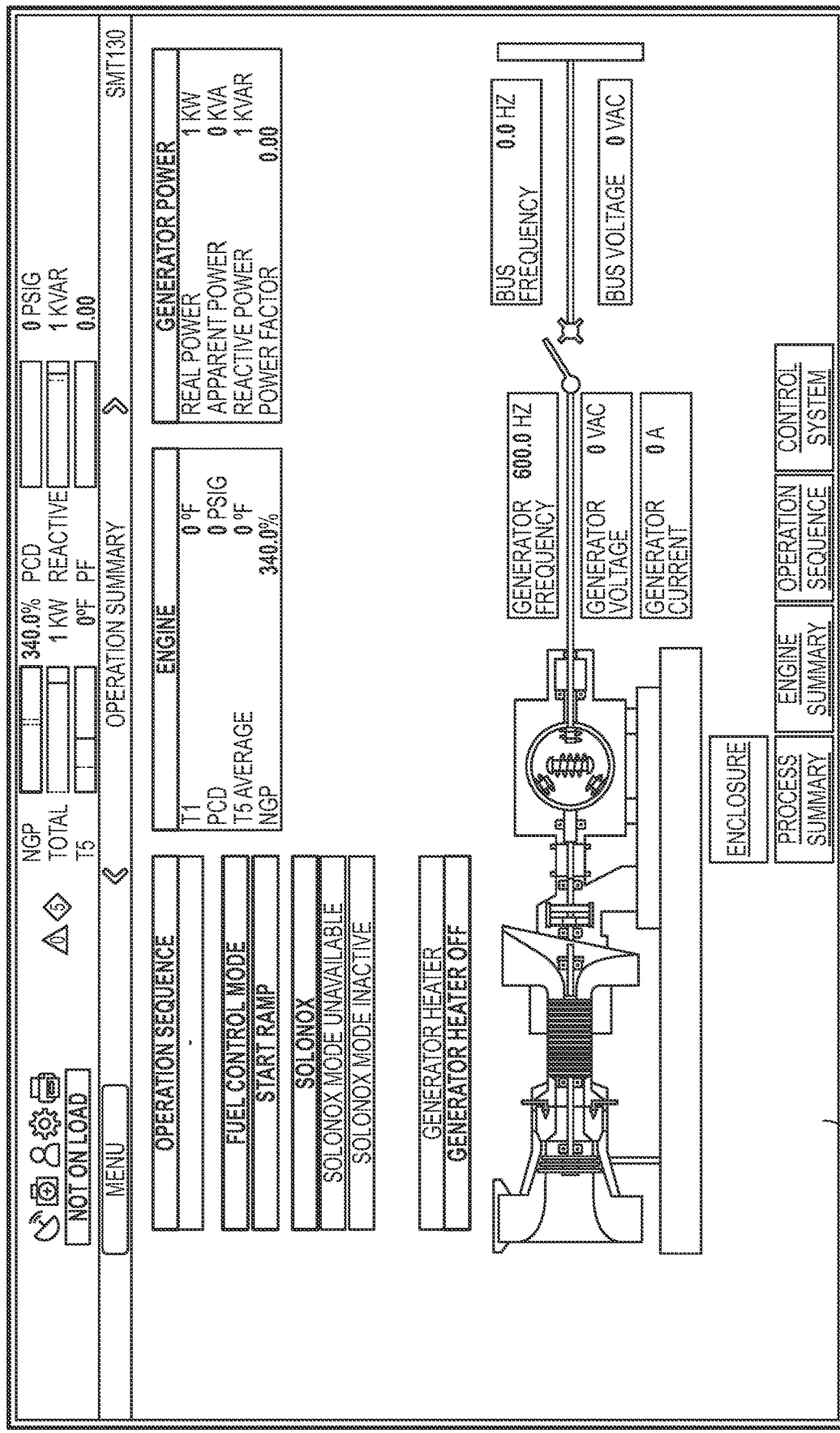
FIGS. 7-10 illustrate example screens of a graphical user interface of a human-machine interface, according to an embodiment.

FIG. 7 illustrates an example screen 700 of a graphical user interface of a human-machine interface 250, according to an embodiment. Screen 700 represents a dashboard of human-machine interface 250 in which a logged-in user may view parameter(s) of the machine and/or interact with inputs for controlling the machine. Screen 700 may represent the dashboard of both local human-machine interface 250L and wireless human-machine interface 250W.

Figure 8:
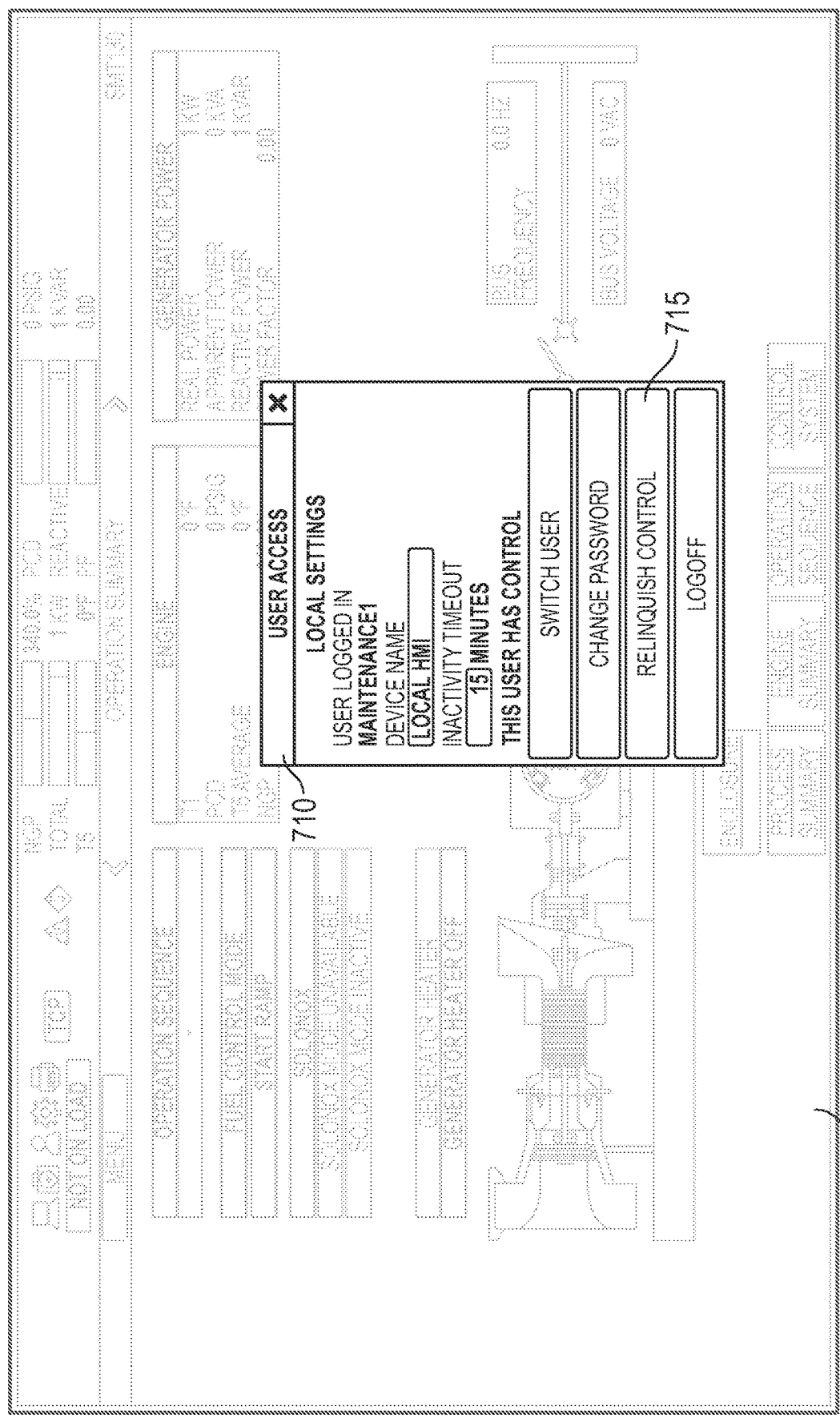

FIG. 8 illustrates screen 700 with a pop-up dialog box 710 for voluntarily relinquishing control of the machine while in the control mode. Dialog box 710 may comprise information, such as the username of the logged-in user, the name of the client device 220 or 230, the duration of the inactivity timer (e.g., fifteen minutes), an indication that human-machine interface 250 is in the control mode, and an input 715 for relinquishing control of the machine (e.g., among other potential inputs). If the user selects input 715, human-machine interface 250 may responsively relinquish control of the machine. It should be understood that this relinquishment of control of the machine corresponds to subprocess 550 in process 500 and subprocess 650 in process 600.

Figure 9:
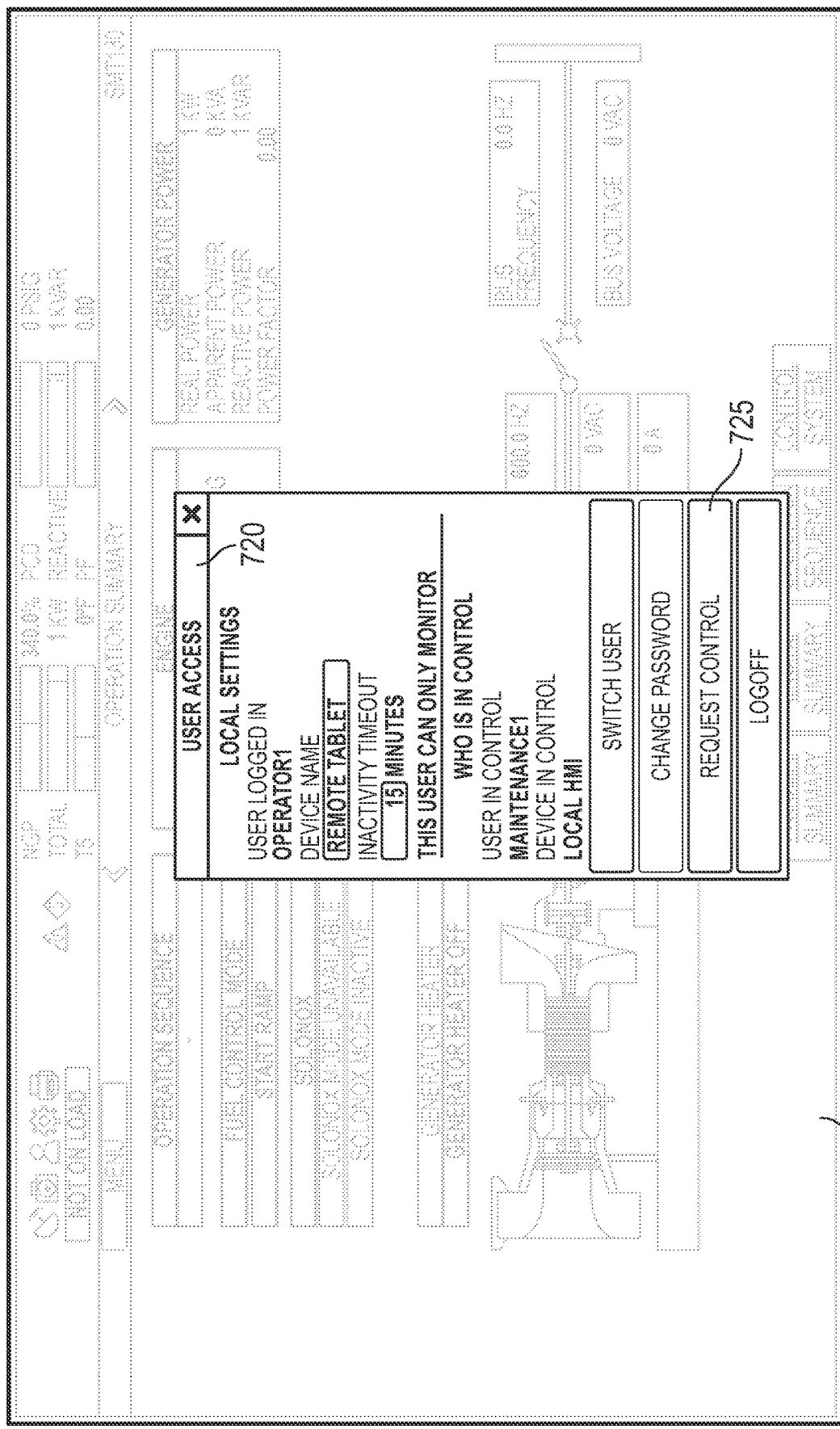

FIG. 9 illustrates screen 700 with a pop-up dialog box 720 for requesting control of the machine while in the read-only mode. Dialog box 720 may comprise information, such as the username of the logged-in user, the name of the client device 220 or 230, the duration of the inactivity timer, an indication that human-machine interface 250 is in the read-only mode, and an input 725 for requesting control of the machine (e.g., among other potential inputs). If the user selects input 725, human-machine interface 250 may responsively request control of the machine from server system 210. It should be understood that this request for control of the machine corresponds to subprocess 570 in process 500 and subprocess 670 in process 600.

Figure 10:
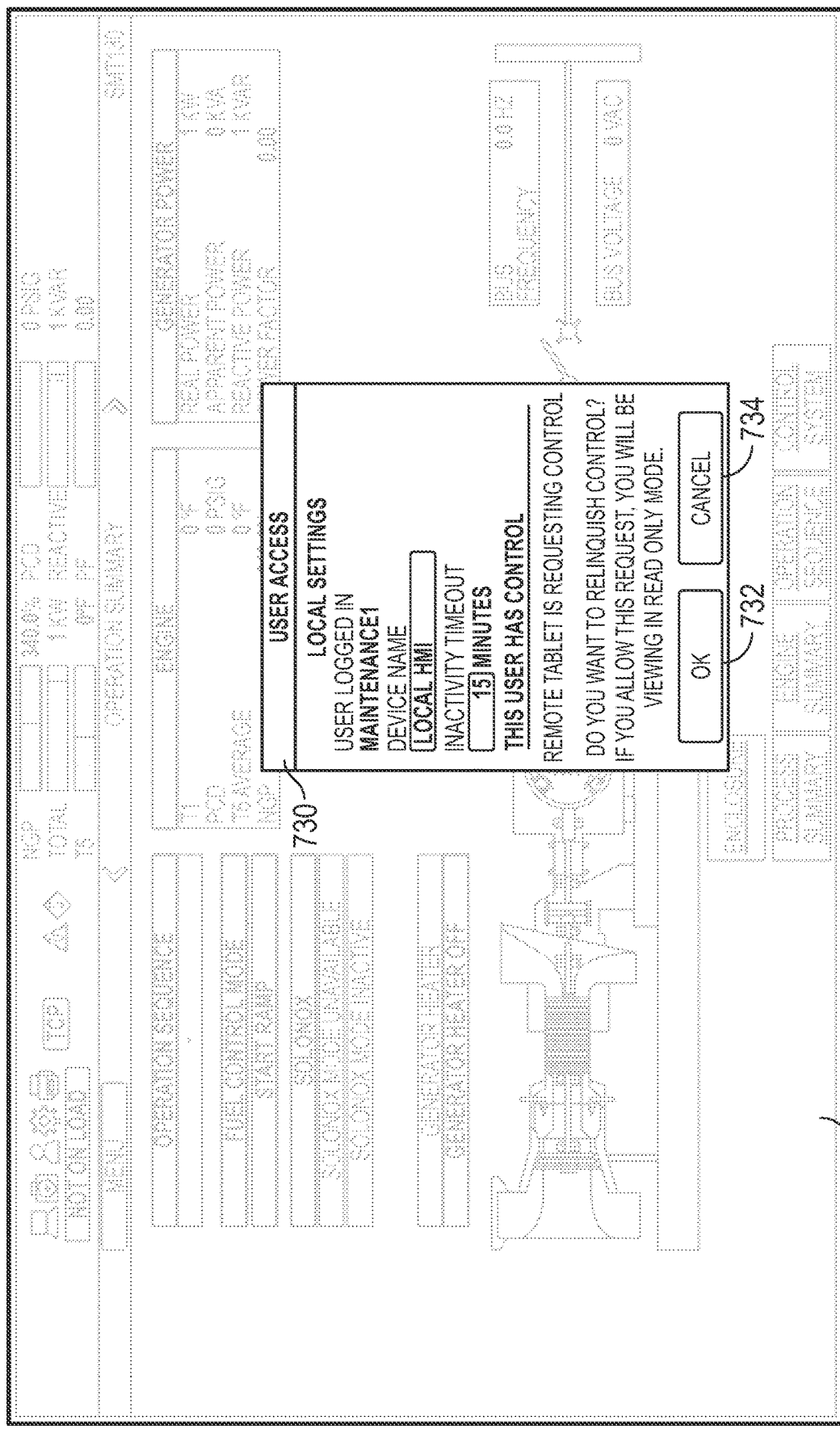

FIG. 10 illustrates screen 700 with a pop-up dialog box 730 prompting the logged-in used to relinquish control of the machine while in the control mode. Dialog box 730 may comprise information, such as the username of the logged-in user, the name of the client device 220 or 230, the duration of the inactivity timer, an indication that human-machine interface 250 is in the control mode, the name of the client device 220 or 230 that is requesting control of the machine, an input 732 for approving the request for control of the machine, and an input 734 for declining the request for control of the machine. If the user selects input 732, human-machine interface 250 may responsively relinquish control of the machine. If the user selects input 734, human-machine interface 250 may retain control of the machine. It should be understood that dialog box 730 corresponds to subprocess 590 in process 500 and subprocess 690 in process 600.

Industrial Applicability

Disclosed embodiments enable a wireless human-machine interface 250W to be used to control a machine, such as a gas turbine engine 100, without sacrificing security. In particular, a server system 210 provides the machine-machine interface for controlling the machine. In an embodiment, a wireless HMI configuration must be enabled in the hardware (e.g., programmable logic controller) of the machine, to prevent this setting from being changed via software. In addition, in an embodiment, only wireless client devices 230 within a security domain and/or within a threshold number of hops from server system 210 are allowed to control the machine.

Additionally or alternatively, server system 210 may ensure that only a single human-machine interface 250 is able to control the machine at any given time. In particular, server system 210 may maintain a record of which human-machine interface 250, if any, is in a control mode, and require that human-machine interface 250 to relinquish control of the machine before granting control to another human-machine interface 250. For example, server system 210 may prompt the human-machine interface 250 that has control to relinquish the control, in response to another human-machine interface 250 requesting control. This prevents conflicts in the control operations that are performed on the machine, which could otherwise result in suboptimal or unsafe operation of the machine.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented with a gas turbine engine, it will be appreciated that it can be implemented with various other types of large machines that are operated via a human-machine interface, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A system comprising:
a server system configured to control operation of a machine;
a local client device that is communicatively coupled with the server system via a wired connection; and
at least one wireless client device that is communicatively coupled with the server system via a wireless connection,
wherein the local client device and the at least one wireless client device execute human-machine interfaces that communicate with the server system,
wherein the human-machine interfaces are configured to switch between a read-only mode, which allows access to one or more parameters of the machine and does not allow control of the machine, and a control mode, which allows access to the one or more parameters of the machine and allows control of the machine, and
wherein the server system is configured to ensure that, at most, only one human-machine interface, of the local client device and the at least one wireless device, is in the control mode at any given time.

2. The system of claim 1, wherein each human-machine interface of the human machine interfaces, in the read-only mode, comprises an input for requesting control of the machine.

3. The system of claim 2,
wherein each human-machine interface of the human machine interfaces is configured to, in the read-only mode, in response to operation of the input for requesting control of the machine, send a request for control of the machine to the server system,
wherein the server system is configured to, in response to receiving the request for control of the machine from a first one of the human-machine interfaces, determine whether or not a second one of the human-machine interfaces is currently in the control mode, when none of the human-machine interfaces are currently in the control mode, cause the first human-machine interface to switch from the read-only mode to the control mode, and
when the second human-machine interface is currently in the control mode, send a request to relinquish control of the machine to the second human-machine interface.

4. The system of claim 3,
wherein each human-machine interface of the human machine interfaces is configured to, in the control mode, in response to receiving the request to relinquish control of the machine, prompt a user to approve or decline the request to relinquish control of the machine, receive an approval or declination of the request to relinquish control of the machine, indicate the approval or declination of the request to relinquish control of the machine to the server system, and switch from the control mode to the read-only mode when the indication is approval of the request to relinquish control of the machine, and
wherein the server system is configured to, when the indication is approval of the request to relinquish control of the machine, cause the first human-machine interface to switch from the read-only mode to the control mode.

5. The system of claim 4, wherein each human machine interface, of the human machine interfaces, to prompt the user to approve or decline the request to relinquish control of the machine is configured to generate a dialog box, overlaid on a screen, wherein the dialog box comprises an input for approving the request to relinquish control of the machine and an input for declining the request to relinquish control of the machine.

6. The system of claim 1, wherein each human-machine interface of the human machine interfaces, in the control mode, comprises an input for relinquishing control of the machine.

7. The system of claim 1, wherein each human-machine interface of the human machine interfaces, in the control mode, comprises a graphical user interface that visually represents one or more parameters of the machine and includes one or more inputs for controlling the machine.

8. The system of claim 7, wherein each human-machine interface of the human machine interfaces, in the read-only mode, comprises a graphical user interface that visually represents the one or more parameters of the machine, but does not include the one or more inputs for controlling the machine.

9. The system of claim 1,
wherein each human-machine interface of the human machine interfaces, in at least the control mode, is configured to periodically send a heartbeat communication to the server system, and
wherein the server system is configured to, when a failure is detected in the heartbeat communications from a human-machine interface, of the human machine interfaces, that is currently in the control mode, force the human-machine interface to relinquish control of the machine.

10. The system of claim 1, wherein the server system is configured to:
load a project configuration for the machine, wherein the project configuration comprises a setting that indicates whether or not wireless control is enabled for the machine; and when the setting indicates that wireless control is enabled for the machine,
determine whether or not there are any authorized wireless client devices communicatively coupled to the server system,
when there is at least one authorized wireless client device communicatively coupled to the server system, set a wireless human-machine interface configuration in which both local control and wireless control are allowed, and
when there are no authorized wireless client devices communicatively coupled to the server system, set a non-wireless human-machine interface configuration in which local control is allowed and wireless control is disallowed.

11. The system of claim 10, wherein determining whether or not there are any authorized wireless client devices comprises determining whether or not there are any wireless client devices within a security domain.

12. The system of claim 11, wherein the security domain is a set of Internet Protocol (IP) addresses, and a wireless client device is determined to be within the security domain when an IP address of the wireless client device is within the set of IP addresses.

13. The system of claim 11, wherein determining whether or not there are any authorized wireless client devices further comprises determining whether or not there are any wireless client devices that are communicatively coupled to the server system by less than or equal to a threshold number of hops, and wherein a wireless client device is determined to be authorized when the wireless client device is both within the security domain and communicatively coupled to the server system by less than or equal to the threshold number of hops.

14. The system of claim 10, wherein loading the project configuration comprises deriving the setting that indicates whether or not wireless control is enabled from a programmable logic controller installed in the machine.

15. The system of claim 1, wherein the machine is a gas turbine engine.

16. A method comprising using at least one hardware processor of a server system that controls a machine to:
maintain a record that indicates which one, if any, of a plurality of human-machine interfaces, communicatively coupled to the server system, is currently in a control mode that allows control of the machine;
receive a request for control of the machine from a first one of the plurality of human-machine interfaces that is in a read-only mode that does not allow control of the machine;
when the record indicates that none of the plurality of human-machine interfaces are currently in the control mode, cause the first human-machine interface to switch from the read-only mode to the control mode; and
when the record indicates that a second one of the plurality of human-machine interfaces is currently in the control mode,
send a request to relinquish control of the machine to the second human-machine interface,
receive an indication of approval or declination of the request to relinquish control of the machine from the second human-machine interface, and
when the indication is approval of the request to relinquish control of the machine, cause the first human-machine interface to switch from the read-only mode to the control mode, after the second human-machine interface is switched from the control mode to the read-only mode.

17. The method of claim 16, further comprising using at least one hardware processor of at least one client device to execute one of the plurality of human-machine interfaces to, in the read-only mode:
generate a graphical user interface that visually represents the one or more parameters of the machine and comprises an input for requesting control of the machine; and
in response to operation of the input for requesting control of the machine, send the request for control of the machine to the server system.

18. The method of claim 16, further comprising using at least one hardware processor of at least one client device to execute one of the plurality of human-machine interfaces to, in the control mode:
generate a graphical user interface that visually represents the one or more parameters of the machine and includes one or more inputs for controlling the machine;
receive the request to relinquish control of the machine from the server system;
in response to receiving the request to relinquish control, generate a dialog box within the graphical user interface, wherein the dialog box comprises one or more inputs for approving or declining the request to relinquish control of the machine;
receive an operation, via the one or more inputs of the dialog box, representing an approval or declination of the request to relinquish control of the machine;
indicate the approval or declination of the request to relinquish control of the machine to the server system; and
when the approval or declination is approval of the request to relinquish control of the machine, switch from the control mode to the read-only mode.

19. The method of claim 16, wherein the machine is a gas turbine engine.

20. A system comprising:
a gas turbine engine;
a structure housing the gas turbine engine;
a server system, installed within the structure and interfaced with the gas turbine engine to control operation of the gas turbine engine;
a local client device that is communicatively coupled with the server system via a wired connection; and
at least one wireless client device that is communicatively coupled with the server system via a wireless connection,
wherein the local client device and the at least one wireless client device execute human-machine interfaces that communicate with the server system,
wherein the human-machine interface is interfaces are configured to switch between a read-only mode, which enables viewing of one or more parameters of the gas turbine engine but does not allow control of the gas turbine engine, and a control mode, which enables viewing of the one or more parameters of the gas turbine engine and allows control of the gas turbine engine, and
wherein the server system is configured to
maintain a record that indicates which one, if any, of the human-machine interfaces is currently in the control mode,
receive a request for control of the gas turbine engine from a first one of the human-machine interfaces that is in the read-only mode, when the record indicates that none of the human-machine interfaces are currently in the control mode, cause the first human-machine interface to switch from the read-only mode to the control mode, and when the record indicates that a second one of the human-machine interfaces is currently in the control mode, send a request to relinquish control of the gas turbine engine to the second human-machine interface, receive an indication of approval or declination of the request to relinquish control of the gas turbine engine from the second human-machine interface, and when the indication is approval of the request to relinquish control of the gas turbine engine, cause the first human-machine interface to switch from the read-only mode to the control mode, after the second human-machine interface is switched from the control mode to the read-only mode.

\* \* \* \* \*